C. A. PSILANDER AND W. M. HENDERSON.
TRACTION WHEEL.
APPLICATION FILED MAR. 12, 1920.

1,418,971.

Patented June 6, 1922.

Inventors
C. A. Psilander.
W. M. Henderson.

By Jas. A. Richmond their Attorney

UNITED STATES PATENT OFFICE.

CHARLES A. PSILANDER AND WILLIAM M. HENDERSON, OF EASTON, PENNSYLVANIA, ASSIGNORS TO WILLIAM WHARTON JR. & COMPANY, INCORPORATED, OF EASTON, PENNSYLVANIA, A CORPORATION OF PENNSYLVANIA.

TRACTION WHEEL.

1,418,971.  Specification of Letters Patent.  Patented June 6, 1922.

Application filed March 12, 1920. Serial No. 365,209.

*To all whom it may concern:*

Be it known that we, CHARLES A. PSILANDER and WILLIAM M. HENDERSON, citizens of the United States, residing at Easton, in the county of Northampton and State of Pennsylvania, have invented certain new and useful Improvements in Traction Wheels, of which the following is a specification.

This invention relates to a connector for the pad-operating springs of a tractor wheel, in the use of which all springs are connected to a single removable member, and the necessity for forming the wheel proper with means to secure the springs is avoided.

In tractor wheels of the particular type with which the present invention is concerned, the wheels are in two sections, between which are mounted a series of pads adapted to engage the ground surface and provide the desired traction. These pads, are forced into operative relation between the peripheral edges of the wheel sections, and withdrawn into normal positions, following their operation, by coil springs connected to such pads and to the wheel structure. The means of connecting the inner ends of such springs forms the subject of the present invention, as instead of forming the wheel structure with openings or the like to permit connection of the springs, the improvement consists in providing a single member, capable of being readily and easily secured in place or removed, and which will permit the securing thereto of the inner ends of all springs employed.

The pads of the tractor wheel of the type referred to are guided in movement between guides forming a fixed part of the wheel structure, and have been heretofore held from complete separation from the wheel by the springs alone. As in the present improvement the springs are not connected to the wheel proper at all, the invention also contemplates a specific means for preventing complete separation of the pads and wheel.

The invention is illustrated in the accompanying drawings, in which:—

The tractor wheel with which the invention is illustrated, comprises spaced wheel sections 1, between the peripheral edges of which are arranged pads 2. The pads are movably mounted between guides 3, connecting the wheel sections 1, and are adapted to be forced into effective traction position by the edges of the sections 1 bearing upon projecting edges of the particular pads.

When free of such bearing action, as following a ground engagement, the pads are returned to normal positions by springs 4, secured to the pads, and with their inner ends held in relation to the wheel structure. As heretofore arranged the inner ends of the springs are secured in holes in or adjacent the wheel hub, and the arrangement of these openings was a matter of considerable time and labor, to say nothing of the difficulty of access for the renewal of a spring.

Figure 1:
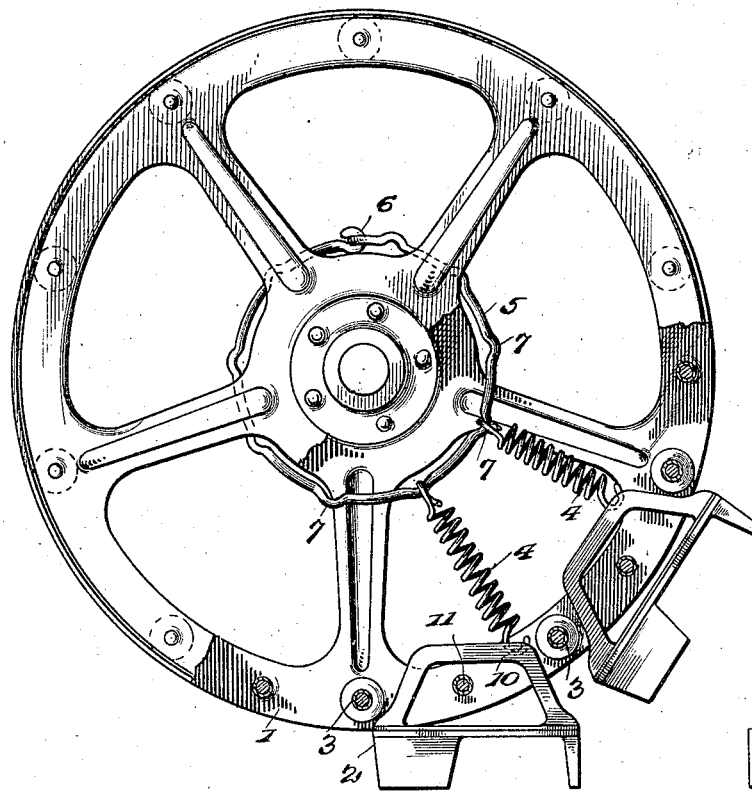
Fig. 1 is a view in section, partly in elevation, showing a tractor wheel with the improved spring connector in place.
Figure 2:
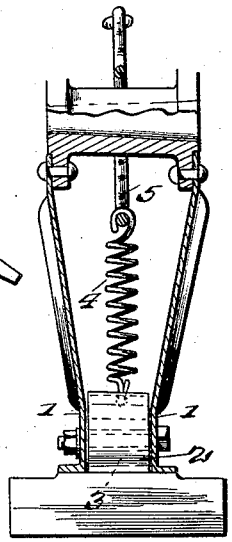
Fig. 2 is a transverse section of the same.

The present invention contemplates a spring connector, made of a single member, as 5, the ends of which are formed for connection or disconnection, as a hook-and-eye connection 6. This member, which may have any appropriate cross section, is bent into annular form about the hub of the wheel, as shown in Fig. 1, and thus provides a ring loosely encircling the hub and materially greater in diameter than the hub. At appropriate points the member 5 is formed with suitable means to permit the securing thereto of the inner ends of the springs 4, such for instance as the offsets or depressions 7. The springs may thus be readily secured in place, and will center the connector relative to the hub under the tension of all springs. Any particular spring is readily connectible in place at its inner end, as the connector is spaced from the hub. Furthermore, the connector as a whole may be readily removed when necessary.

Figure 3:
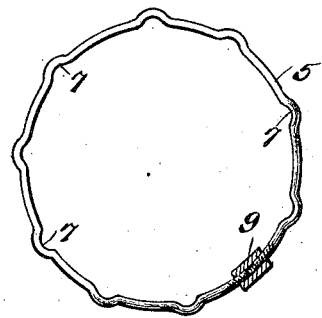
Fig. 3 is an elevation of a modified form of spring connector.

In Fig. 3 there is shown a slightly modified form of connector, in that the connector 8 there shown, has its terminals formed for the removable connection of a coupling 9, whereby the connection or disconnection of the member may be readily effected.

The springs 4 are wholly free of connection with the wheel proper, and hence means must be provided for preventing separation of the pads and wheel in the event of spring breakage. This is provided for by construction of the pad body of skeleton form, including an outline defining bar 10, and arranging a pin 11 through the skeleton pad body, within the bar 10, the pin 11 being secured in the respective wheel sections. With this construction the pads cannot become separated from the wheel proper in the event of breakage of the spring or connector.

Having thus described the invention, what is claimed as new, is:—

A tractor wheel having a hub, a rim, double spokes, pads mounted for free movement relative to the rim, a floating element retained by the hub and arranged between the spokes, and a resilient connector between said element and each pad.

In testimony whereof we affix our signatures.

CHARLES A. PSILANDER.
WILLIAM M. HENDERSON.